US008610698B2

(12) United States Patent
Saito et al.

(10) Patent No.: US 8,610,698 B2
(45) Date of Patent: Dec. 17, 2013

(54) DISPLAY DEVICE

(75) Inventors: Taku Saito, Mobara (JP); Shuuichirou Matsumoto, Mobara (JP); Mitsuru Goto, Chiba (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 917 days.

(21) Appl. No.: 12/700,755

(22) Filed: Feb. 5, 2010

(65) Prior Publication Data

US 2010/0231570 A1 Sep. 16, 2010

(30) Foreign Application Priority Data

Mar. 13, 2009 (JP) ................................ 2009-061415

(51) Int. Cl.
*G06F 3/038* (2013.01)
*G09G 5/00* (2006.01)

(52) U.S. Cl.
USPC .......................................................... 345/211

(58) Field of Classification Search
USPC ......... 323/246, 265, 271, 280, 281, 282, 283, 323/311, 312, 317, 351; 345/86–104, 345/204–215
See application file for complete search history.

(56) References Cited

U.S. PATENT DOCUMENTS 5,959,855 A * 9/1999 Ishii et al. ...................... 363/95
6,191,568 B1 * 2/2001 Poletti .......................... 323/268
6,314,529 B1 * 11/2001 Rana .............................. 714/29
6,487,246 B1 * 11/2002 Hoeld ........................... 375/238
6,545,545 B1 * 4/2003 Fernandez-Texon ......... 331/1 R
2004/0189272 A1 9/2004 Matsuura et al.
2007/0085521 A1 4/2007 Nagai

FOREIGN PATENT DOCUMENTS

EP 1246461 A2 * 10/2002
JP 2004-304871 10/2004

* cited by examiner

*Primary Examiner* — Timothy J Dole
*Assistant Examiner* — Carlos Rivera-Perez
(74) *Attorney, Agent, or Firm* — Antonelli, Terry, Stout & Kraus, LLP.

(57) ABSTRACT

To provide a display device including a switching regulator type power generating circuit which realizes an increase in display quality by an output voltage being more stable, and by suppressing a flickering of a screen. A display device includes a switching regulator type direct current power generating circuit, wherein a period for which a switching element is turned on is determined in such a way as to increase or decrease by a given width when a code of an output voltage with respect to a setting voltage is constant, and the period is determined in such a way as to increase or decrease differently from the given width when the code changes.

3 Claims, 11 Drawing Sheets

DISPLAY DEVICE

CROSS-REFERENCE TO RELATED APPLICATION

The present application claims priority from Japanese application JP 2009-061415 filed on Mar. 13, 2009, the content of which is hereby incorporated by reference into this application.

BACKGROUND OF THE INVENTION

1. Field of the Invention

The present invention relates to a display device including a direct current power generating circuit. In particular, the invention relates to an increase in a display quality of a display device by stabilizing an output voltage of a switching regulator type direct current power generating circuit.

2. Background Art

There is a case of including a drive circuit driven by a voltage higher than a voltage of a direct current main power source included in a display device. In this case, a drive power source which provides a predetermined voltage to the drive circuit is needed. In a power generating circuit provided in the drive power source, the voltage from the main power source is raised, generating the predetermined voltage.

As a method of raising the voltage, in addition to a charge pump method, there is a switching regulator method. Along with the improvement in resolution and definition of display panels in recent years, it happens that the high drive performance switching regulator method is employed in the power generating circuit. As one control mode of the switching regulator method, there is a pulse width modulation (PWM) mode, which stabilizes the output voltage by changing a pulse width which determines a period for which a switching element connected to a voltage raising circuit is turned on. Herein, the pulse width indicates a length of a period for which a signal sent to the switching element is of a high voltage value. In this mode, in the event that the output voltage is lower than a setting voltage (hereafter referred to as "the output voltage is L"), the on period of the switching element becomes longer by increasing the pulse width, and it is possible to increase the output voltage. Meanwhile, in the event that the output voltage is higher than the setting voltage (hereafter referred to as "the output voltage is H"), the on period of the switching element becomes shorter by reducing the pulse width, and it is possible to reduce the output voltage. By repeating these operations, it is possible to stabilize the output voltage in the vicinity of the setting voltage.

A power generating circuit provided in a display device according to a heretofore known technology is shown in FIG. 3. A configuration of the whole of the power generating circuit has many areas in common with a power generating circuit provided in a display device according to the invention. Therefore, a detailed description of the configuration is given in a description of an embodiment of the invention. At this point, a simple description will be given of an outline of the configuration of the power generating circuit.

As shown in FIG. 3, a voltage raising circuit 1 being provided in the power generating circuit, it raises the voltage of a main power source 11 of the display device. A switching element 2 which drives the voltage raising circuit 1 is connected. An on period signal generating module 3 being connected to the switching element 2, the on period signal generating module 3 outputs an on period signal S23 to signal line 23, which is a signal which turns on the switching element 2, to the switching element 2 during an on period.

Also, an output voltage detection module 4 is connected to an output voltage $V_{out}$ of the voltage raising circuit 1. The output voltage detection module 4 detects whether the output voltage $V_{out}$ is H or L for every certain cycle (hereafter referred to as a cycle). The output voltage detection module 4 outputs a voltage with a high voltage value (hereafter referred to as the H voltage) when the output voltage $V_{out}$ is H, and a voltage with a low voltage value (hereafter referred to as the L voltage) when the output voltage $V_{out}$ is L, as a detection code S21, to an on period determination module 5 by the signal line 21.

In the on period determination module 5, the length of the on period, that is, the pulse width, is determined based on the detection code S21, and output to the on period signal generating module 3 as on period information S22 by the signal line 22. Herein, the on period information S22 is a value which expresses the length of the period for which the switching element is to be turned on (the on period), with a clock signal PCLK cycle as a unit.

In the on period signal generating module 3, the on period signal S23 is generated based on the on period information S22, and output to the switching element 2 by signal line 23.

In the on period determination module 5, based on the detection code S21 at the first moment of each cycle (hereafter referred to as the commencement), the length of the on period, that is, the pulse width, in the period of the cycle following the cycle, is determined. As the length of the on period is set based on the clock signal PCLK used in a display by the display device, the length of the period is determined at an integral multiple of the clock signal PCLK cycle. Herein, the clock signal PCLK is, for example, a dot clock signal. Hereafter, the length of the period will be written with the clock signal PCLK cycle as the unit.

FIG. 4 is an outline diagram showing a configuration of the on period determination module 5. A period increase-decrease element 31, based on the detection code S21 input from the output voltage detection module 4 by the signal line 21, adds or subtracts a given width to or from a value of an input signal, which is current on period information S24 inputting by the signal line 24, and outputs it as a value of next on period information S25 by the signal line 25. Herein, the given width is set at 1. In this case, when the detection code S21 is the L voltage, the period increase-decrease element 31 adds 1 to the value of the input signal, and outputs it. When the detection code S21 is the H voltage, the period increase-decrease element 31 subtracts 1 from the value of the input signal, and outputs it.

The next on period information S25 is input into a D terminal of an information output module 32. Herein, the information output module 32, in accordance with a clock rising edge, continues to output D terminal information input at that time from a Q terminal until the rising edge of the next clock. A cycle signal CLK rising at the commencement of each cycle is input into a clock of the information output module 32. Therefore, the information output module 32, at the commencement of the next cycle, outputs the value of the next on period information S25 to the on period signal generating module 3 as the value of the on period information S22.

The on period signal generating module 3 generates the on period signal S23, based on the input on period information S22, and outputs it to the switching element 2. By means of the above, a control of the output voltage $V_{out}$ is carried out.

SUMMARY OF THE INVENTION

FIG. 13 is a diagram showing a temporal change of the output voltage $V_{out}$ controlled by the power generating circuit according to the heretofore known technology, the detection code S21, and the on period information S22. In FIG. 13, the output voltage $V_{out}$, the detection code S21, and the on period information S22 are shown in order from the top of the drawing. The horizontal direction is the time. Each cycle being a period delimited by a plurality of dotted lines extending in the vertical direction in the drawing, a specific cycle among the cycles is indicated by a code $C_1$, $C_2$, $C_3$, and so on.

As previously described, the output voltage detection module 4 outputs the detection code S21 for every cycle, indicating whether the output voltage $V_{out}$ is H or L. In the event that the output voltage $V_{out}$ changes as in A of FIG. 13, the detection code S21 changes accordingly as in FIG. 13. That is, when the output voltage $V_{out}$ changes from L to H (H to L), the detection code S21 changes from L to H (H to L) at the commencement of the next cycle.

As previously described, the on period determination module 5, based on the detection code S21 of a certain cycle, adds or subtracts 1 to or from the value of the on period information S22 of the cycle, and takes it as the value of the on period information S22 of the next cycle. That is, in the event that the detection code S21 of a certain cycle is the H voltage, a value wherein 1 is subtracted from the value of the on period information S22 of the cycle becomes the value of the on period information S22 of the next cycle, while in the event that the detection code S21 of a certain cycle is the L voltage, a value wherein 1 is added to the value of the on period information S22 of the cycle becomes the value of the on period information S22 of the next cycle.

In the event that the detection code S21 changes as in FIG. 13, the on period information S22 changes accordingly as in FIG. 13. For example, the value of the on period information S22 in the cycle $C_1$ is 43. Then, as the detection code S21 is the L voltage in the cycle $C_1$, the value of the on period information S22 in the next cycle $C_2$ is 44, which is a value wherein 1 is added to 43, which is the value of the on period information S22 of the cycle $C_1$. In the same way, as the detection code S21 of the cycle $C_2$ is the L voltage, the value of the on period information S22 in the next cycle $C_3$ is 45, which is a value wherein 1 is added to 44.

However, as the detection code S21 of the cycle $C_3$ has changed to the H voltage, the value of the on period information S22 in the next cycle $C_4$ is 44, which is a value wherein 1 is subtracted from 45, which is the value of the on period information S22 in the cycle $C_3$. In the same way, as the detection code S21 of the cycle $C_4$ is the H voltage, the value of the on period information S22 in the next cycle $C_5$ is 43, which is a value wherein 1 is subtracted from 44.

A case in which the detection code S21 changes from L to H (from H to L) in two consecutive cycles will be considered. It is conceivable that, in order to achieve the setting voltage, the value of the on period information S22 in the latter cycle of the two cycles is an excessively large (small) value. That is, it is conceivable that a gap of considerably more than 1 (that is, the clock signal PCLK cycle) has occurred with respect to the optimum length of an on period for outputting the setting voltage.

Despite this, in a certain cycle, the on period determination module 5, based on the detection code S21 in the cycle, only adds or subtracts 1 to or from the length of the on period of the cycle following the cycle. Therefore, in the case in which the detection code S21 changes from L to H (from H to L) too, with regard to the latter cycle, the length of the on period in the cycle following the latter cycle is no more than one wherein 1 is subtracted from (added to) the length of the on period in the latter cycle. Therefore, in the cycle following the latter cycle too, in the same way as in the latter cycle, there is still a large gap between the length of the on period and the length of the optimum on period.

For this reason, although the pulse width is decreased (increased) by 1 in each successive cycle, a period until the detection code S21 first changes from H to L (L to H) is unavoidably long. That is, the period between the output voltage $V_{out}$ once changing from L to H (H to L) and next changing from H to L (L to H) is long. When the period is long, a period during the period for which the output voltage continues to rise (fall) is also long, meaning that the maximum value of the gap between the output voltage and setting voltage, that is, the maximum value of a fluctuation of the output voltage with respect to the setting voltage, is large. Due to the fluctuation, a gradation voltage applied to a pixel electrode is affected, and there is a problem in that it causes a flickering of a screen.

For example, with the case shown in FIG. 13, the detection code S21 changes from L to H in $C_2$ and $C_3$, which are two consecutive cycles. The value of the on period information S22 in the cycle $C_3$, at 45, is a value which can be considered to be excessively large for achieving the setting voltage. Therefore, although the value of the on period information S22 of the cycle $C_4$ is 44, which is a value wherein 1 is subtracted from 45, which is the value of the on period information S22 of the cycle $C_3$, this value can also be considered to be a considerably large value. In this case, for a while from the cycle $C_4$ onward too, the value of the on period information S22 decreases by one for each cycle. However, as the value of the on period information S22 of the cycle $C_4$ is an excessively large value, the output voltage $V_{out}$ continues to rise for a while after too, and a problem occurs in that the maximum value of the fluctuation is a large value.

Therein, the invention, bearing in mind the heretofore described problems, has an object of providing a display device including a power generating circuit which realizes an increase in display quality by further stabilizing an output voltage, suppressing a fluctuation of the output voltage with respect to a setting voltage, and suppressing a flickering of a screen.

A display device according to an embodiment of the invention includes a voltage raising circuit, a switching element which drives the voltage raising circuit, an on period signal generating unit which outputs a signal turning on the switching element to the switching element during an on period, an output voltage detection unit which, every predetermined cycle, detects a code of an output voltage of the voltage raising circuit with respect to a predetermined setting voltage, and an on period determination unit which, every predetermined cycle, determines a length of an on period of a following cycle based on the code, and includes a switching regulator type direct current power generating circuit.

The on period determination unit determines the on period of the following cycle in such a way that the length of the on period increases or decreases monotonously by a given width in accordance with a timing at which the code is the same in two consecutive cycles, and determines the on period in such a way that the length of the on period increases or decreases differently from the given width in accordance with a timing at which the code differs in two consecutive cycles.

The on period determination unit including a storage module which stores on period information, the storage module stores at least one item of on period information in accordance with a timing at which the code differs in two consecutive cycle periods, and the on period determination unit, in accordance with a timing at which the code differs in two consecutive cycle periods, determines an on period based on the on information stored by the storage module.

The on period determination unit, in accordance with a timing at which the code differs in two consecutive cycle periods, determines the length of an on period by taking an average value of an on period corresponding to the timing and on period stored in the storage module.

According to the embodiment of the invention, it is possible to provide a display device including a power generating circuit which realizes an increase in display quality by further stabilizing an output voltage, suppressing a fluctuation of the output voltage with respect to a setting voltage, and suppressing a flickering of a screen.

BRIEF DESCRIPTION OF THE DRAWINGS

FIG. 10A shows a flow of a current when charging, and FIG. 10B when discharging;

DETAILED DESCRIPTION OF THE EMBODIMENT

Figure 1:
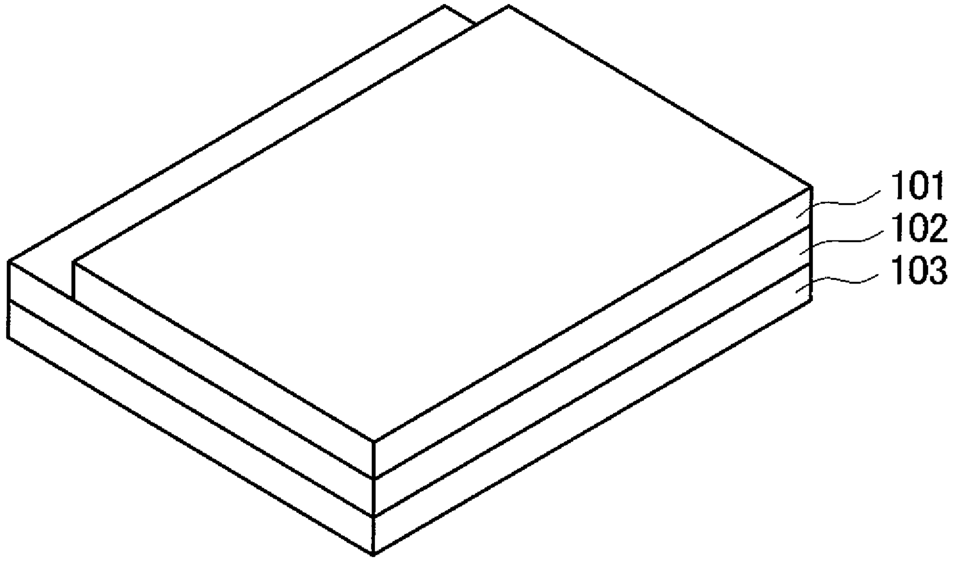
FIG. 1 is a schematic diagram showing the whole of a display device representing one example of an embodiment of the invention.

A display device according to an embodiment of the invention, being, for example, an in-plane switching (IPS) type liquid crystal display device, is configured including a TFT substrate 102, in which are disposed scanning signal lines 105, image signal lines 107, pixel electrodes 110, common electrodes 111, thin film transistors (hereafter referred to as a TFT) 109, which are switching elements, and the like, a filter substrate 101, on which a color filter is provided, opposing the TFT substrate 102, a liquid crystal material enclosed in an area sandwiched between the two substrates, and a backlight 103 positioned in contact with the side of the TFT substrate 102 opposite that of the filter substrate 101, as shown in the schematic diagram of FIG. 1.

Figure 2:
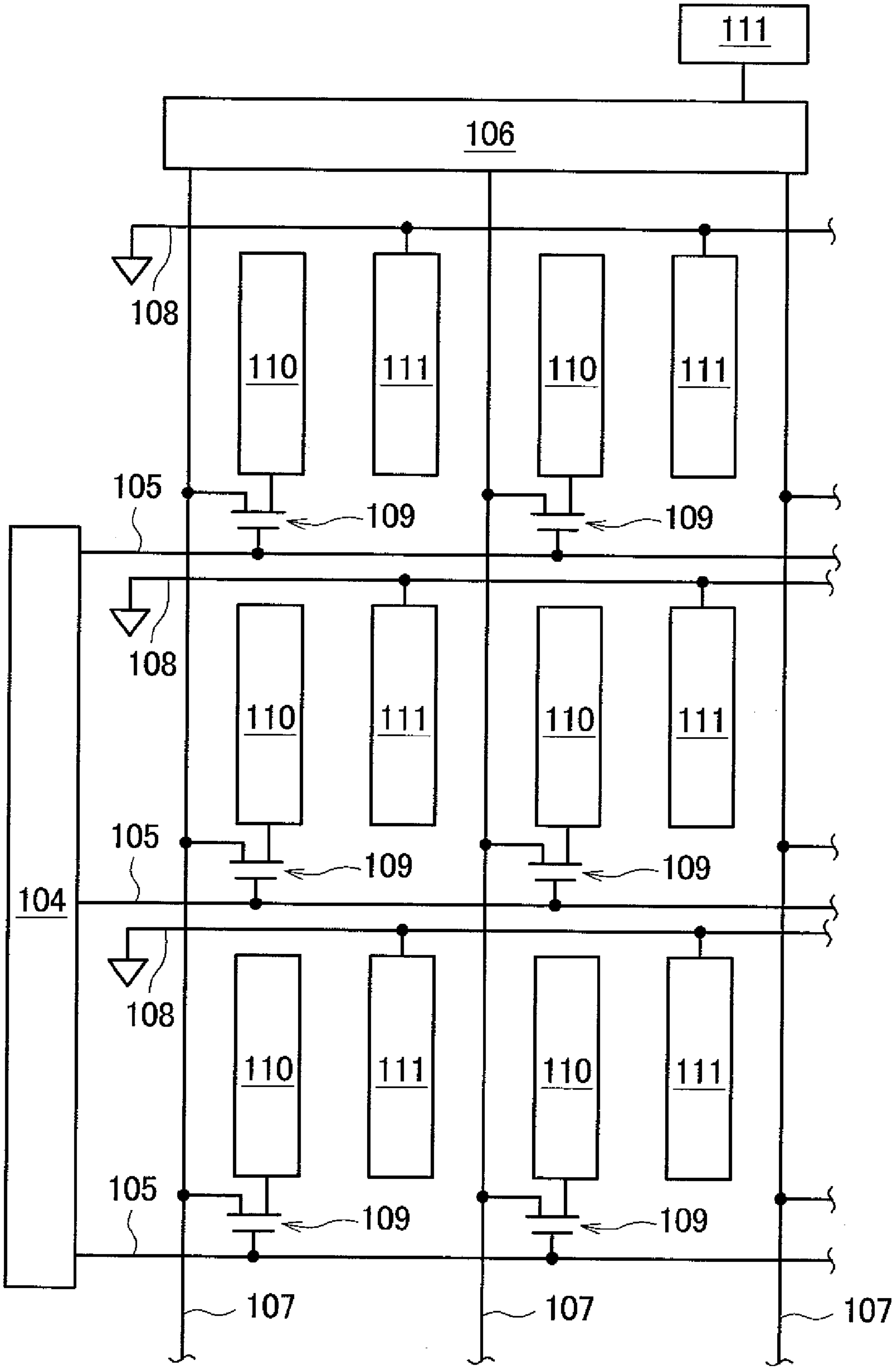
FIG. 2 is a diagram of an equivalent circuit of a TFT substrate which is one portion of the display device indicating one example of the embodiment of the invention.

FIG. 2 is an outline diagram showing an equivalent circuit of the heretofore described TFT substrate 102 of the liquid crystal display device. In the TFT substrate 102 in FIG. 2, a multiplicity of scanning signal lines 105 connected to a gate drive circuit 104 extend in a horizontal direction in the diagram, with equal spaces between them. Also, a multiplicity of image signal lines 107 connected to a data drive circuit 106 extend in a vertical direction in the diagram, with equal spaces between them. Then, pixel areas arranged in a chess board pattern are partitioned off by the scanning signal lines 105 and image signal lines 107. Also, common signal lines 108 extend in the horizontal direction in the diagram, parallel to each scanning line 105.

A TFT 109 being formed in a corner of each pixel area partitioned off by the scanning signal lines 105 and image signal lines 107, it is connected to an image signal line 107 and a pixel electrode 110. Also, a gate electrode of the TFT 109 is connected to a scanning signal line 105. A common electrode 111 is formed opposing the pixel electrode 110 in each pixel area.

In the heretofore described circuit configuration, a reference voltage is applied to the common electrode 111 of each pixel area via the common signal line 108. Also, by selectively applying a gate voltage to the gate electrode of the TFT 109 with the scanning signal line 105, a current flowing in the TFT 109 is controlled. A voltage of a video signal supplied to the image signal line 107 is selectively applied to the pixel electrode 110 through the TFT 109 to whose gate electrode the gate voltage is selectively applied. Because of this, a potential difference occurs between the pixel electrode 110 and common electrode 111, and an orientation and the like of liquid crystal molecules is controlled, due to which, an amount of blocking of light from the backlight 103 is controlled, and an image is displayed.

A power generating circuit according to the embodiment is used in, for example, a drive power source 112 which provides a predetermined voltage to the data drive circuit 106. The predetermined voltage is a voltage which is higher than a voltage of a main power source 11 provided in the display device. Therefore, the power generating circuit raises the voltage of the main power source 11 to the predetermined voltage, and outputs the predetermined voltage consistently.

Figure 3:
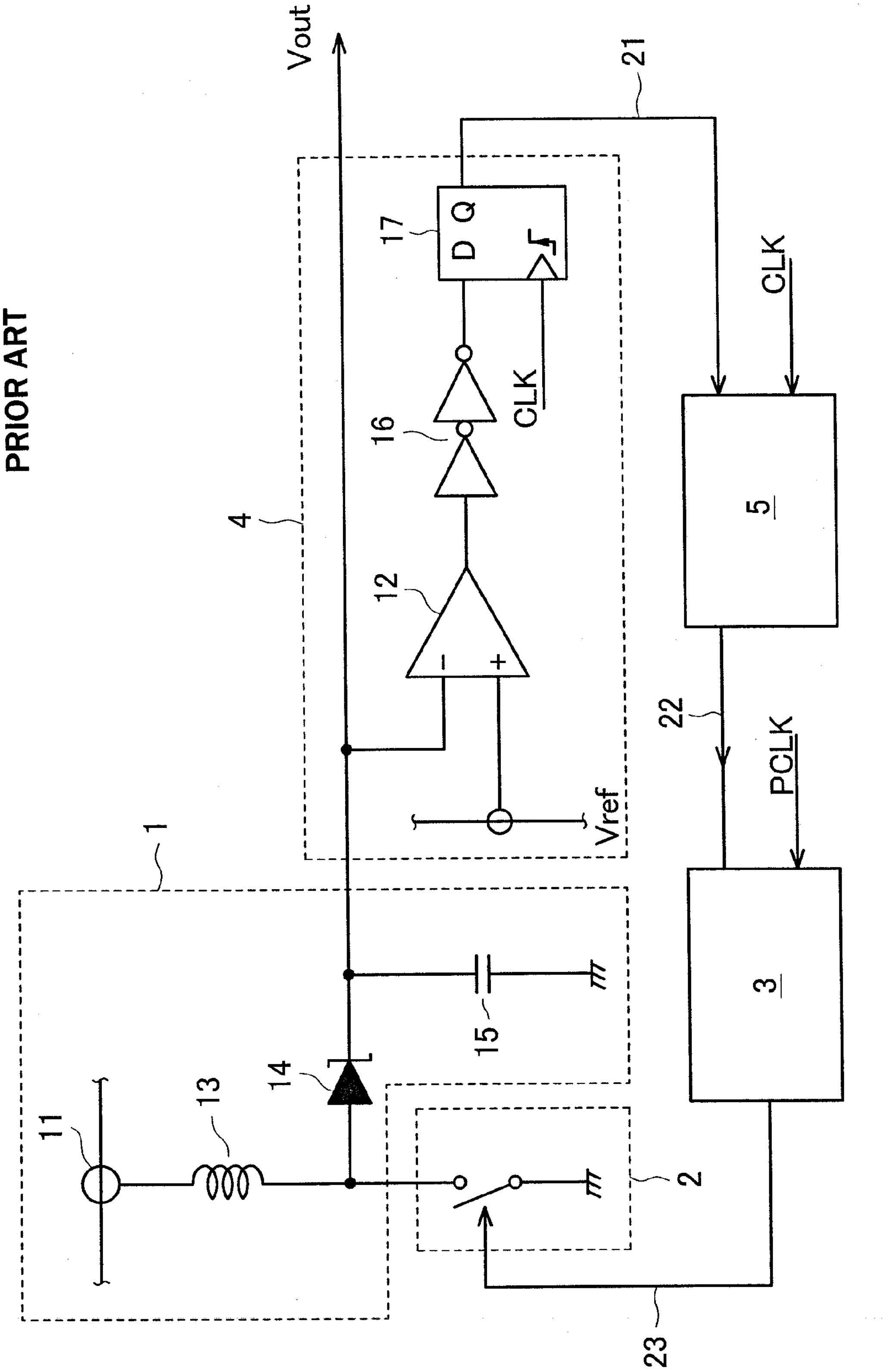
FIG. 3 PRIOR ART
FIG. 3 is an outline diagram showing a configuration of a power generating circuit indicating one example of heretofore known technology and one example of the embodiment of the invention.
Figure 4:
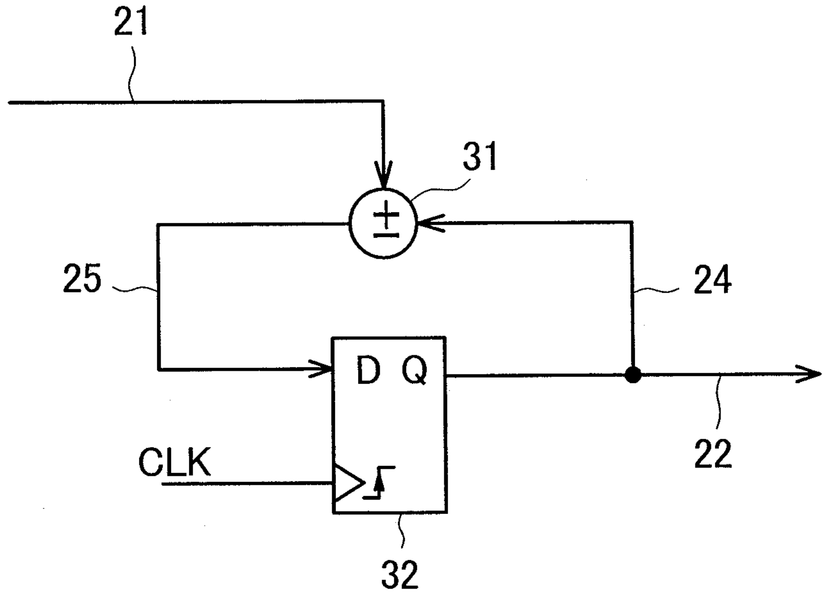
FIG. 4 PRIOR ART
FIG. 4 is an outline diagram showing a configuration of an on period determination module according to the heretofore known technology.

A configuration diagram of the power generating circuit is shown in FIG. 3. The configuration of the power generating circuit is such that the basic configuration is the same as the configuration of the power generating circuit according to the previously described heretofore known technology. A main difference from the power generating circuit according to the previously described heretofore known technology is a configuration of an on period determination module 5.

Voltage Raising Circuit 1

There is a voltage raising circuit 1 which raises the voltage from the main power source 11 provided in the display device. A switching element 2 is connected to the voltage raising circuit 1. While the switching element 2 is turned on, electromagnetic energy is accumulated in a coil 13 due to a current flowing from the main power source 11. After the switching element 2 is turned off, a current flows into a capacitor 15, via a zener diode 14, due to the accumulated electromagnetic energy, and the capacitor 15 is further charged. Therefore, a potential difference between polar plates of the capacitor 15 increases, and a raised voltage is output as an output voltage $V_{out}$.

Switching Element 2

The switching element 2 is controlled by an on period signal S23 sent by a signal line 23 and generated by an on period signal generation module 3, which is an on period signal generation unit. Herein, the on period signal S23 is a signal which turns on the switching element 2, and the length of an on period, which is a period for which the switching element 2 is turned on, indicates the previously described pulse width. That is, a period for which the switching element 2 is turned off is of an L voltage, while a period for which the switching element 2 is turned on is of an H voltage. The length of a period which is of the H voltage is the pulse width.

Output Voltage Detection Module 4

An output voltage detection module 4, which is an output voltage detection unit, is connected to the output voltage $V_{out}$ of the voltage raising circuit 1. The output voltage detection module 4, at a commencement of each cycle, detects whether the output voltage $V_{out}$ is high or low by comparing it with a setting voltage $V_{ref}$. The output voltage detection module 4 outputs an H (positive polarity) voltage to a signal line 21 as a detection code S21 in the event that the output voltage $V_{out}$ is high in comparison with the setting voltage $V_{ref}$ (in the event that the polarity is positive), and conversely, outputs an L (negative polarity) voltage as the detection code S21 in the event that the output voltage $V_{out}$ is low (in the event that the polarity is negative).

An analog comparator 12 being provided in the output voltage detection module 4, the setting voltage $V_{ref}$ is connected as a reference voltage to a plus input terminal, and also, the output voltage $V_{out}$ of the voltage raising circuit 1 is connected to a minus input terminal. Depending on whether the output voltage $V_{out}$ is high or low in comparison with the setting voltage $V_{ref}$ at an output terminal of the analog comparator 12, an H or L voltage is output as a comparator output $V_{comp}$, and subsequently, the comparator output $V_{comp}$ is enhanced by a buffer 16, and input into a D terminal of a D flip-flop 17.

As a cycle signal CLK is a rising edge signal at the commencement of each cycle, the H or L voltage is output as the detection code S21 in the relevant cycle, based on information on the comparator output $V_{comp}$ of the analog comparator 12 at the time.

Figure 5:
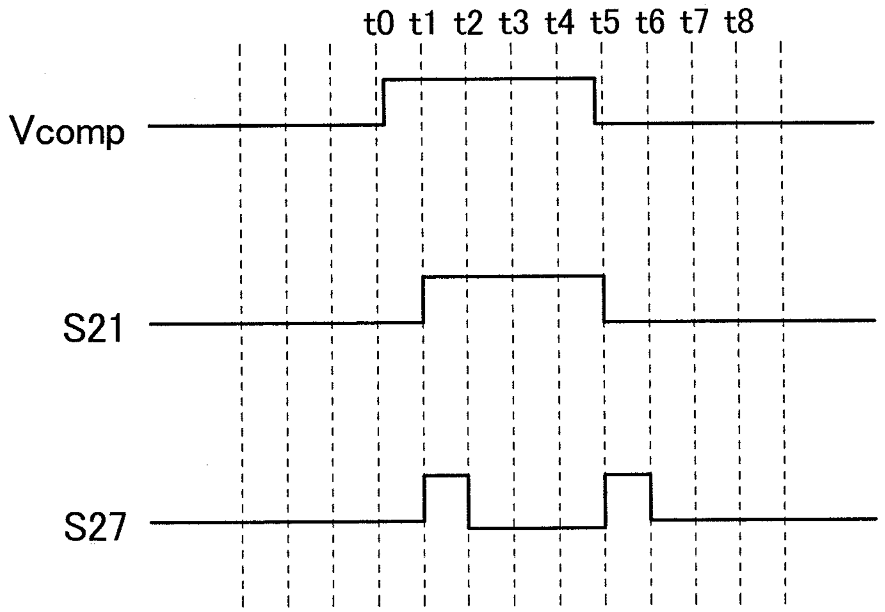
FIG. 5 is an outline diagram showing a temporal change of an output of an analog comparator, a detection code, and a change point signal.

FIG. 5 is a diagram showing a temporal change of the comparator output $V_{comp}$, the detection code S21, and a change point signal S27, to be described hereafter. The comparator output $V_{comp}$, the detection code S21, and the change point signal S27 being shown in FIG. 5 in order from the top of the drawing, the horizontal direction is the time. Each cycle being a period delimited by a plurality of dotted lines extending in the vertical direction in the drawing, the commencement time of each cycle is indicated respectively by a code $t_0$, $t_1$, $t_2$, and so on.

In FIG. 5, the comparator output $V_{comp}$ changes from L to H between the times $t_0$ and $t_1$. As the D flip-flop 17 provided in the output voltage detection module 4 outputs the comparator output $V_{comp}$ at the commencement of every cycle, in FIG. 5, the first time the comparator output $V_{comp}$ is detected as the H voltage is at the time $t_1$. Therefore, the detection code S21 changes from L to H at the time $t_1$.

Subsequently, the comparator output $V_{comp}$ changes from H to L between the times $t_4$ and $t_5$. Until that time, the comparator output $V_{comp}$ maintains H. Therefore, as the output voltage detection module 4 sequentially outputs the fact that the comparator output $V_{comp}$ is H at the commencement of each cycle (the times $t_1$ to $t_4$ in the drawing), the output voltage detection module 4 continues to output the H voltage as the detection code S21 during this period.

Then, at the time $t_5$, after the comparator output $V_{comp}$ has changed from H to L, the output voltage detection module 4 outputs the fact that the comparator output $V_{comp}$ is L. Therefore, at the time $t_5$, the detection code S21 changes from H to L. For awhile subsequently, as the $V_{comp}$ maintains L, the output voltage detection module 4 continues to output L as the detection code S21. A description will be given hereafter of the change point signal S27.

On Period Determination Module 5

The on period determination module 5, which is an on period determination unit, being connected to the output voltage detection module 4, the detection code S21 and cycle signal CLK are input into the on period determination module 5. The on period determination module 5, based on the detection code S21, determines a period for which the switching element 2 is to be turned on, and outputs on period information S22 which dictates the period. Herein, the on period information S22, as previously described, is a value which expresses the length of the period for which the switching element 2 is to be turned on (the on period), with a clock signal PCLK cycle as a unit.

Figure 6:
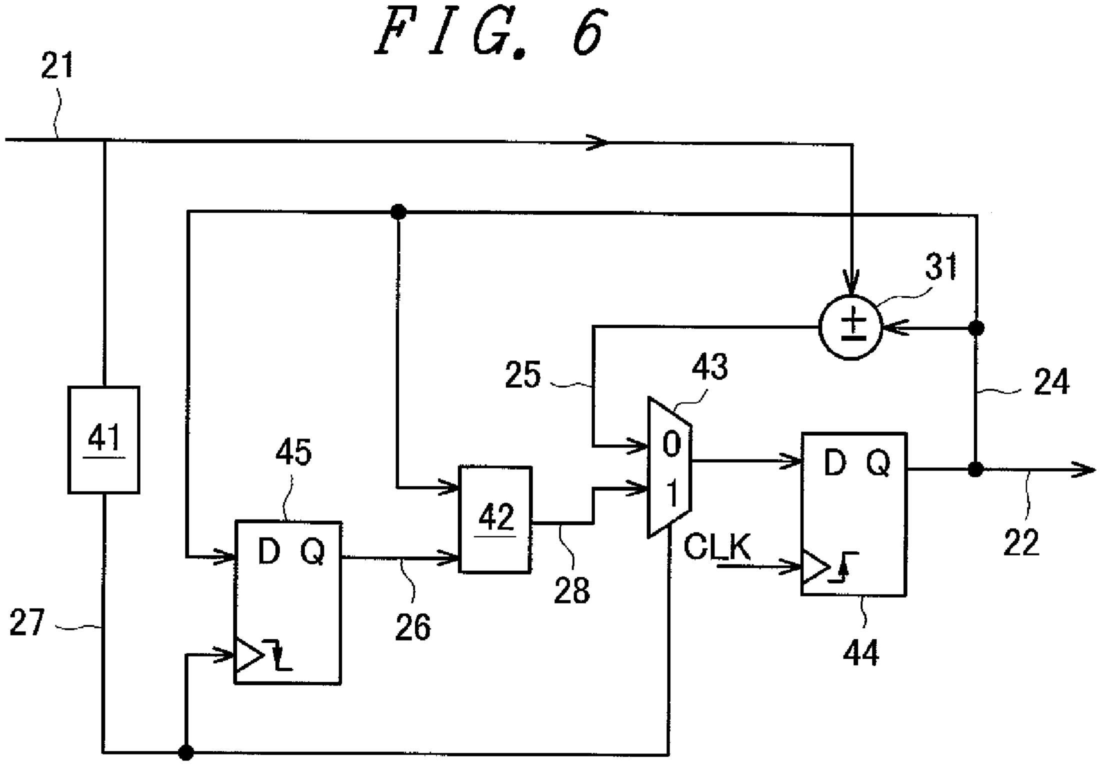
FIG. 6 is an outline diagram showing a configuration of an on period determination module indicating one example of the embodiment of the invention.

FIG. 6 is an outline diagram showing a configuration of the on period determination module 5 according to the embodiment. The on period determination module 5 has a configuration differing from that of the on period determination module 5 according to the heretofore known technology. A selector 43 being provided in the on period determination module 5, a differing on period determination unit is selected by the selector 43 at a constant code time and a code change time, based on the change point signal S27, to be described hereafter.

Herein, a description will be given of the change point signal S27 which send by a signal line 27. The change point signal S27 is a signal which is generated, based on the detection code S21 output from the output voltage detection unit 4, in a change point signal generating module 41 provided in the on period determination module 5. The change point signal generating module 41, in the event that the detection code S21 has changed from L to H, or from H to L, at the commencement of a certain cycle, outputs the H voltage as the change point signal S27 throughout the period of the cycle. Also, in periods other than this, the change point signal generating module 41 outputs the L voltage as the change point signal S27.

As previously described, the temporal change of the detection code S21 and the change point signal S27 is shown in FIG. 5. At the time $t_1$, the detection code S21 changes from L to H. Therefore, in the cycle which commences at the time $t_1$, that is, throughout the period between the times $t_1$ and $t_2$, the change point signal S27 is of the H voltage. In the same way, at the time $t_5$, the detection code S21 changes from H to L. Therefore, in the cycle which commences at the time $t_5$, that is, throughout the period between the times $t_5$ and $t_6$, the change point signal S27, in the same way, is of the H voltage. That is, in the event that either change, the change from L to H or the change from H to L, occurs at the commencement of a certain cycle, the H voltage is output for the period of that cycle. Then, in cycles other than that, that is, in the event that the detection code S21 is maintained at L (H), the change point, signal S27 is of the L voltage.

The change point signal S27, as well as being input into the selector 43, is also input into a clock of a storage module 45. The selector 43 detects whether it is a constant code time or a code change time by means of the change point signal S27, and selects accordingly so as to determine the on period.

Herein, the constant code time refers to the latter cycle when the detection code S21 is H (L) for both of two consecutive cycles. In the same way, the code change time refers to the latter cycle when the detection code S21 changes from H to L (L to H) during two consecutive cycles. Also, it is also acceptable to say that the constant code time is a cycle in which the change point signal S27 is of the L voltage, and the code change time is a cycle in which the change point signal S27 is of the H voltage.

As previously described, the on period determination module 5 according to the heretofore known technology, regardless of whether a certain cycle is a constant code time or code change time, determines the on period of the next cycle, based on the detection code S21, by adding or subtracting the given width during the on period of the cycle.

The on period determination module 5 according to the embodiment, at a constant code time, determines the on period with a similar unit. The detection code S21 output by the output voltage detection module 4 is input into a period increase-decrease element 31. The period increase-decrease element 31, as previously described, adds or subtracts the given width to or from an input signal value, based on the detection code S21, and outputs it. Herein, in a certain cycle, current on period information S24, which is on period information S22, is an input signal to the period increase-decrease element 31. Therefore, an output signal of the period increase-decrease element 31 is next on period information S25, wherein 1 is added to or subtracted from the value of the current on period information S24, based on the detection code S21. Herein, in the same way as in the case of the heretofore described heretofore known technology, the given width is set as one unit. The next on period information S25 output by the period increase-decrease element 31 is input into the selector 43 by the signal line 25.

The on period determination module 5 according to the embodiment including a separate unit determining the on period for a code change time, in addition to the heretofore described unit determining the on period for a constant code time, the unit is configured of the storage module 45 and an average value generating module 42. Herein, the storage module 45 is a recording module which stores on period information in accordance with a code change time.

Although the heretofore described change point signal S27 is input into the clock of the storage module 45, at the time of a clock signal falling edge, the storage module 45, unlike the information output module 32, continues to output D terminal information input at that time from a Q terminal until the falling edge of the next clock.

That is, a time at which the change point signal S27 is falling is a time at which a cycle which is a code change time finishes (hereafter referred to as a termination). Therefore, the storage module 45 outputs the current on period information S24 in the code change time from the Q terminal at the termination of the code change time. This signal is referred to as previous change time on period information S26 which is sent by a signal line 26.

The current on period information S24 and previous change time on period information S26 are input into the average value generating module 42. The average value generating module 42 outputs an average value of the two input signals to the selector 43 as average on period information S28 which is sent by a signal line 28.

The selector 43 selects the next on period information S25 at a constant code time, that is, when the change point signal S27 is of the L voltage, and outputs it to a D terminal of an information output module 44. Also, the selector 43 selects the average on period information S28 at a code change time, that is, when the change point signal S27 is of the H voltage, and outputs it to the D terminal of the information output module 44.

The information output module 44, in accordance with a clock rising edge, continues to output D terminal information input at that time from a Q terminal until the rising edge of the next clock, in the same way as the information output module 32. The cycle signal CLK rising at the commencement of each cycle is input into a clock of the information output module 44. Therefore, the information output module 44 outputs the output signal from the selector 43 to the on period signal generating module 3, as the on period information S22 by the signal line 22, at the commencement of the next cycle.

According to the above, at a constant code time, the on period determination module 5 according to the embodiment, in the same way as the on period determination module 5 according to the heretofore known technology, adds one unit to or subtracts one unit from the value of the on period information S22 of the relevant constant code time, based on the detection code S21, and outputs it at the commencement of the next cycle as the on period information S22 of the next cycle.

At a code change time, the on period determination module 5 according to the embodiment, unlike the on period determination module 5 according to the heretofore known technology, outputs the average value of the on period information according to the code change time and the on period information according to the previous code change time.

On Period Signal Generating Module 3

The on period signal generating module 3 being connected to the on period determination module 5, the on period information S22 and previously described clock signal PCLK are input into the on period signal generating module 3. The on period signal generating module 3, based on these input signals, generates the on period signal S23, and outputs it to the switching element 2 by the signal line 23.

Figure 7:
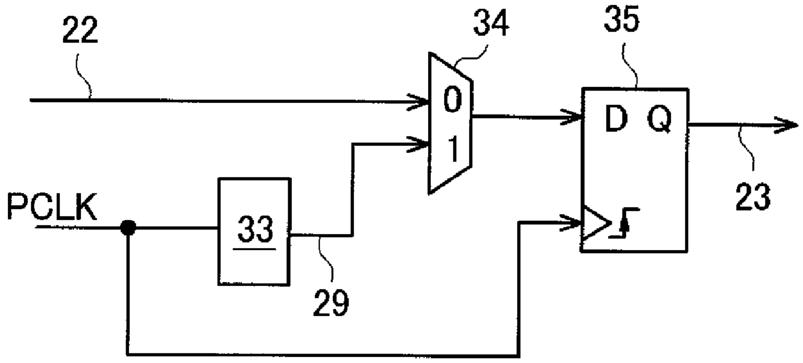
FIG. 7 is an outline diagram showing a configuration of an on period signal generating module indicating one example of the embodiment of the invention.

FIG. 7 is an outline diagram showing a configuration of the on period signal generating module 3. The clock signal PCLK is input into a cycle counter 33 and a clock of a D flip-flop 35.

The previously mentioned each cycle is defined as being the cycle of the clock signal PCLK integrally multiplied by a predetermined number. The cycle counter 33, being a counter reset at the predetermined number, counts sequentially, 1, 2, 3, from the commencement of each cycle, for every cycle of the clock signal PCLK, and outputs a counter value S29 to a size detecting selector 34 by a signal line 29. Also, the on period information S22 output by the on period determination module 5 is input into the size detecting selector 34.

In the size detecting selector 34, a size relationship between the counter value S29 and on period information S22, which are the two input signals, is detected. The size detecting selector 34 outputs the H voltage, in the event that the value of the on period information S22 is greater than, or equal to, the counter value S29, and the L voltage, in the event that the value of the on period information S22 is less than the counter value S29, to a D terminal of the D flip-flop 35.

In the D flip-flop 35, an output signal of the size detecting selector 34 is output from a Q terminal every time the clock signal PCLK rises. Because of this, a signal which outputs the H voltage, that is, the on period signal S23, is generated throughout a period in which the cycle of the clock signal PCLK is multiplied by the value of the on period information S22. Herein, as previously described, the H voltage period of the on period signal S23 is the pulse width.

In this way, the on period signal S23 is generated in the on period signal generating module 3, and output to the switching element 2.

The above is the configuration of the power generating circuit according to the embodiment. The on period determination module 5 according to the embodiment, at a constant code time, increases or decreases the given width in the constant code time on period, based on the detection code S21 at the constant code time, and determines the on period of the next cycle. As opposed to this, at a code change time, the on period determination module 5, the on period of the cycle following the previous code change time being stored in the storage module 45, determines the average value of that on period and the on period of the current code change time as the on period of the next cycle. This on period determined at the code change time is nearer to an optimum value than the on period determined by the on period determination module 5 according to the heretofore known technology.

Because of this, the period until the next code change time being shorter with the display device according to the embodiment than with the display device according to the heretofore known technology, the maximum value of the difference between the output voltage and setting voltage, that is, the maximum value of a fluctuation of the output voltage with respect to the setting voltage, in the drive power source according to the embodiment is smaller than in the drive power source according to the heretofore known technology. Because of this, a gradation voltage applied to the pixel electrode provided in the display device becomes more stable, and it is possible to suppress a flickering of the screen. Because of this, an increase in display quality is realized.

Figure 13:
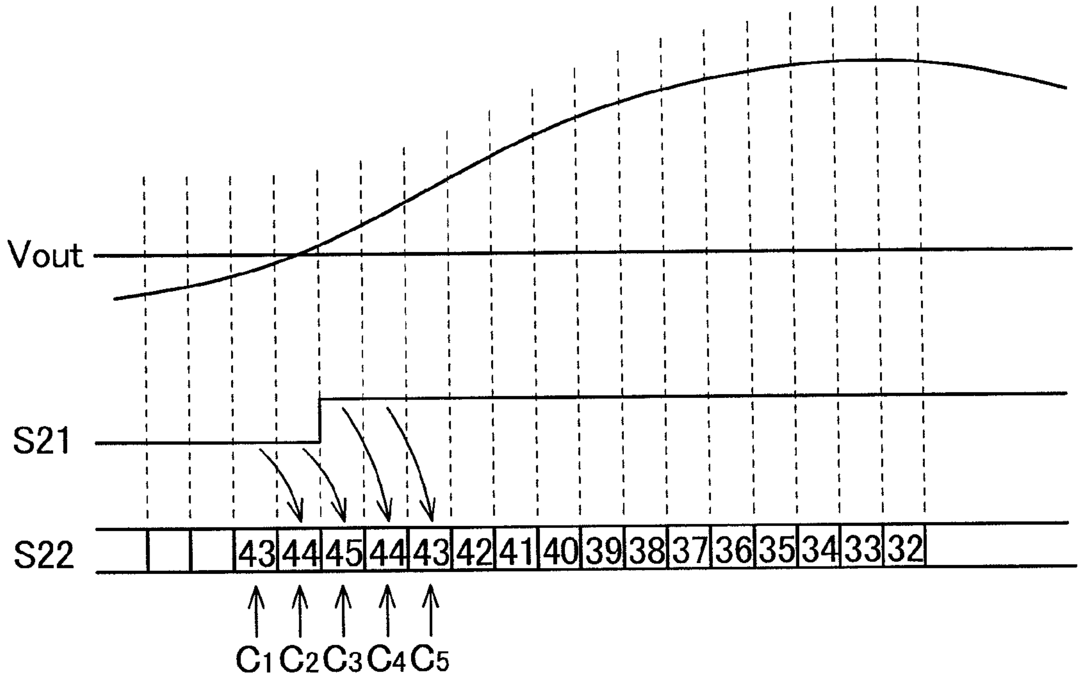
FIG. 13 PRIOR ART
FIG. 13 is a diagram showing an on period determination unit of the on period determination module according to the heretofore known technology.
Figure 14:
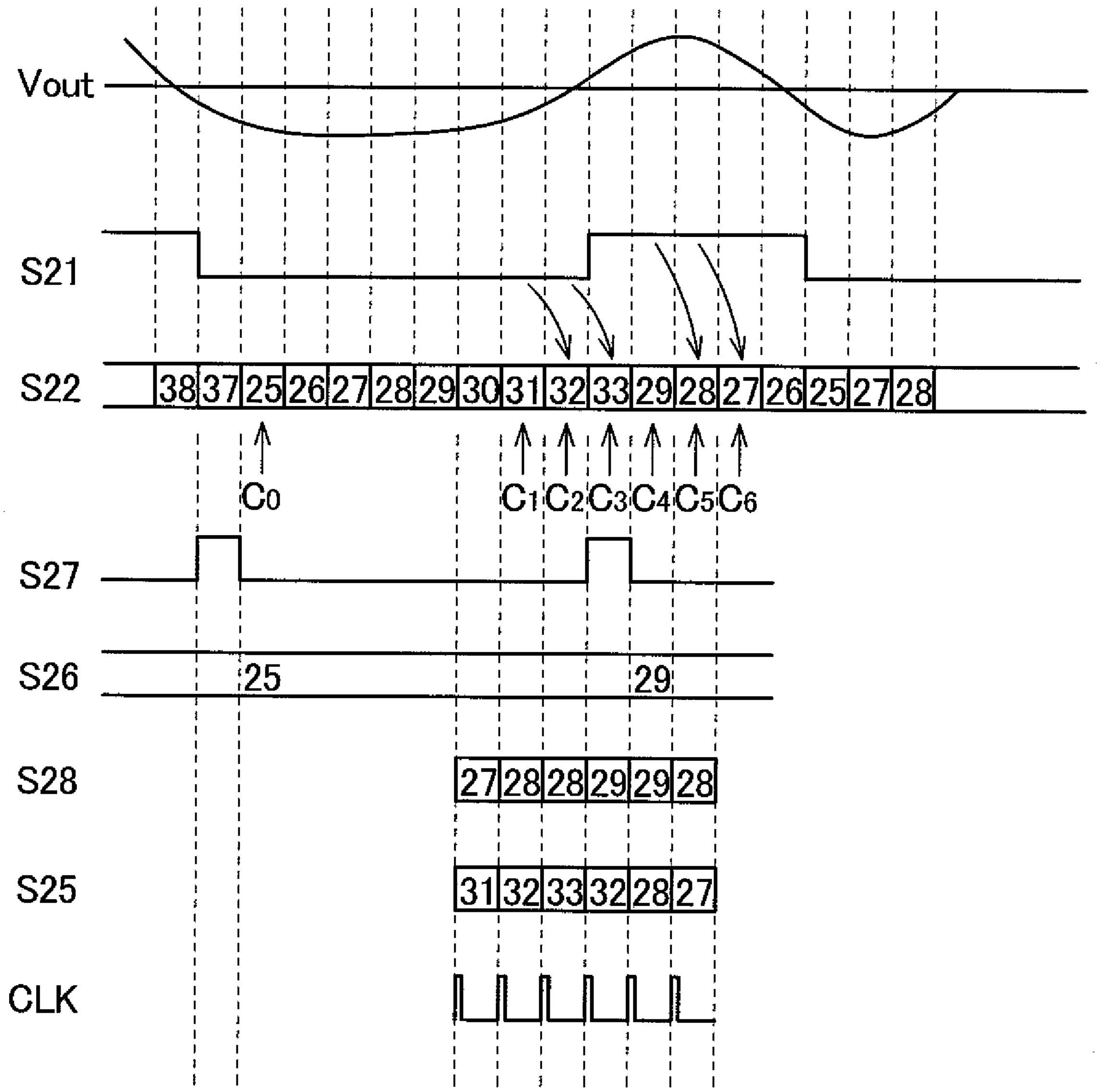
FIG. 14 is a diagram showing an on period determination unit of the on period determination module indicating one example of the embodiment of the invention.

FIG. 14 is a diagram representing a temporal change of the output voltage $V_{out}$ controlled by the power generating circuit according to the embodiment, the detection code S21, the on period information S22, the change point signal S27, the previous change time on period information S26, the average on period information S28, the next on period information S25, and the cycle signal CLK. The output voltage $V_{out}$, the detection code S21, and the on period information S22, in the same way as in FIG. 13, which shows the power generating circuit according to the heretofore known technology, and furthermore, The change point signal S27, the previous change time on period information S26, the average on period information S28, the next on period information S25, and the cycle signal CLK are shown in order from the top of the drawing. The horizontal direction is the time. Each cycle being a period delimited by a plurality of dotted lines extending in the vertical direction in the drawing, a specific cycle among the cycles is indicated by a code $C_2$, $C_3$, and so on.

As previously described, when a certain cycle is a constant code time, the on period determination module 5, based on the detection code S21 of the cycle, takes a value wherein 1 is added to or subtracted from the value of the on period information S22 of the cycle as the value of the on period information S22 of the next cycle. For example, as shown in FIG. 14, as the detection code S21 in the cycles $C_1$ and $C_2$ is the same L voltage as the detection code S21 of the previous cycle, the cycles $C_1$ and $C_2$ are constant code times. The value of the on period information S22 in the cycle $C_1$ being 31, the detection code S21 is the L voltage. Therefore, in the cycle $C_1$, the value of the next on period information S25 is 32, which is a value wherein 1 is added to 31, which is the value of the on period information S22. Also, as the change point signal S27 is of the L voltage, the selector 43 outputs the value to the information output module 44. Therefore, the information output module 44 outputs 32, which is the value wherein 1 is added to 31, which is the value of the on period information S22 in the cycle $C_1$, as the value of the on period information S22 in $C_2$, which is the next cycle. In the same way, as the detection code S21 in the cycle $C_2$ is the L voltage, the value of the on period information S22 in the cycle $C_3$ increases by 1 to 33.

In contrast to the detection code S21 in the cycle $C_2$ being the L voltage, the detection code S21 in $C_3$, which is the next cycle, is the H voltage, which differs from that of the cycle $C_2$. That is, the cycle $C_3$ is a code change time. As previously described, the method of determining the on period in the cycle $C_3$, which is a code change time, differs from the determination method at a constant code time. In the cycle $C_3$, the storage module 45 outputs S25, which is the value of the on period information S22 of $C_0$, which is the cycle following the previous code change time, to the average value generating module 42 as the previous change time on period information S26. Therefore, the average value generating module 42 outputs 29, which is the average value of S25, which is the value of the on period information S22 of the cycle $C_0$, and 33, which is the value of the current on period information S22 in the cycle $C_3$, as the average on period information S28.

As the change point signal S27 is of the H voltage in the cycle $C_3$, which is a code change time, the selector 43 outputs 29, which is the value of the average on period information S28, to the information output module 44. Therefore, the information output module 44 outputs 29 as the value of the on period information S22 in the cycle $C_4$.

Subsequently, also, as there is a return to a constant code time for a while from the cycle $C_4$ onward, the values of the on period information S22 in the cycles $C_5$ and $C_6$ decrease by 1 each to 28 and 27.

In the heretofore described embodiment, with the cycle of the clock signal PCLK as a unit, the given width by which the on period determination module 5 increases or decreases the length of the on period at a constant code time is taken to be 1. However, due to the relationship between the cycle of the PCLK and the typical length of the on period signal S23, it is also acceptable to set a value of the given width to other than 1. Furthermore, in the same way, although the cycle of the clock signal PCLK is taken as the unit of the length of the on period, it is also acceptable to set with another period as the unit.

Furthermore, the on period determination module 5 according to the embodiment stores the on period of the cycle following the code change time previous to the relevant code change time in the storage module 45. However, it is sufficient that on period information to be stored in the storage module is on period information appropriate to the code change time. For example, it is acceptable to store the on period of the cycle previous to the code change time, it is acceptable that the on period information is a combination of a plurality of cycles previous to and subsequent to the code change time, and it is acceptable that it is an average value, or the like, thereof.

Furthermore, at a code change time, the on period determination module 5 according to the embodiment determines the on period of the cycle following the code change time, based on the on period stored in the storage module and the on period of the code change time. However, the on period determination module 5 determining the on period by a method other than increasing or decreasing the given width, such as taking an average value, not being limited to the code change time, is also acceptable in the cycle following the code change time, or furthermore, in the cycle following that, and also, in one, or a combination of cycles, among consecutive cycles including the code change time, provided that it is based on the code change time. Furthermore, it is acceptable that the on period information stored in the storage module is stored in accordance with the following code change time, and it is also acceptable that it is further stored until after that.

Furthermore, at a code change time, the on period determination module 5 according to the embodiment takes the average value of the on period information stored in the storage module and the on period information at the code change time, determining the information as the on period information of the next cycle. However, provided that the method of determining the on period is a method which determines an on period nearer to an optimum value than does the method of determining the on period at the constant code time, it is acceptable that it is a method other than that of taking the average value. For example, it is acceptable to further add or subtract the given width to or from the average value of the on period stored in the storage module and the on period of the code change time, based on the detection code of the code change time, and it is also acceptable to determine the on period based only on the on period stored in the storage module.

Furthermore, the on period determination module 5 according to the embodiment stores only one item of on period information for a previous cycle in the storage module. However, the on period information stored in the storage module not being limited to one item, it is also acceptable that a plurality of items of on period information are stored. In this case, for example, it is acceptable that the on period determination module 5 determines the on period of the next cycle by taking the average of all, or selective one portion, of the plurality of items of stored on period information and the on period of the code change time.

Abnormal Termination Time Problem Prevention Circuit

In the event that the clock signal PCLK comes to an abnormal stop, the on period signal generating module 3 provided in the power generating circuit outputs the voltage at the time of the abnormal stop to the switching element 2, as the output on period signal S23, after the abnormal stop too.

In both the power generating circuit according to the heretofore known technology and the power generating circuit according to the embodiment, the on period signal S23 is generated based on the clock signal PCLK. Because of this, in either case, when the clock signal PCLK comes to an abnormal stop, it is conceivable that the on period signal S23 is maintained as it is at the H voltage. In this case, as the switching element 2 subsequently remains turned on, a large current flows from the main power source 11 to the switching element 2, and may inflict considerable damage on the power generating circuit.

Therefore, in order to solve this problem, an abnormal termination time problem prevention circuit 51, which prevents a problem from occurring when the clock comes to an abnormal stop, is provided in parallel with the on period signal generating module 3 according to the heretofore known technology or the on period signal generating module 3 according to the invention. The abnormal termination time problem prevention circuit 51 is configured of a secondary voltage raising circuit 52 and clock stop detection module 53 connected in series. A logical sum signal of a pre-correction on period signal 54, which is the output of the on period signal generating module 3, and a clock stop detection signal 55, which is the output of the abnormal termination time problem prevention circuit 51, is generated by a signal logical sum module 56, and output as the on period signal S23. Herein, the logical sum is such that the H voltage is output only when the two input signals are both of the H voltage, while the L voltage is output in cases other than this.

Figure 8:
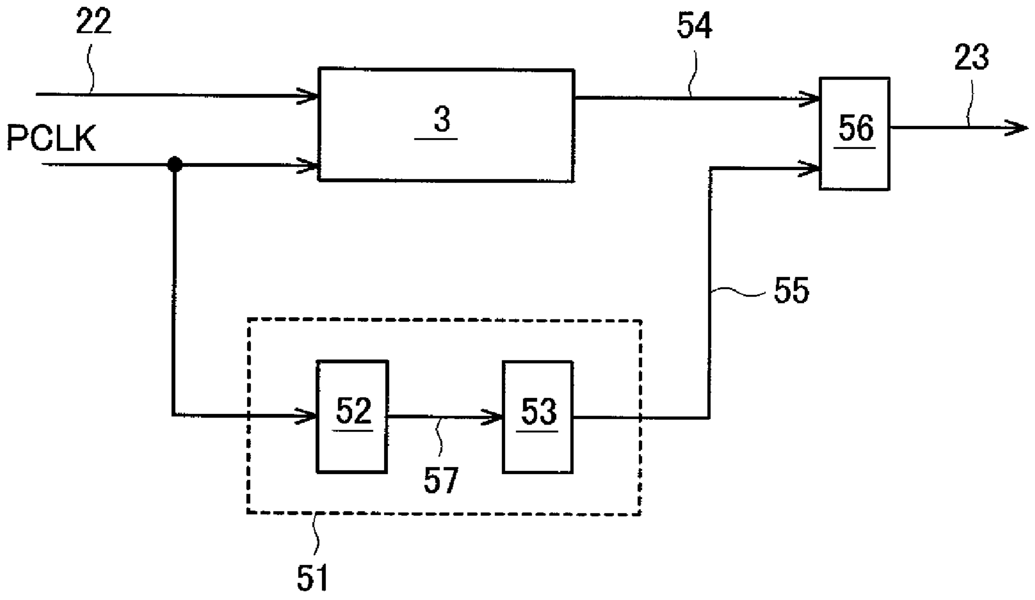
FIG. 8 is an outline diagram showing a configuration of a corrected on period signal generating module indicating one example of the embodiment of the invention.

These components are shown in FIG. 8 as a corrected on period signal generating module 6. In the corrected on period signal generating module 6, the abnormal termination time problem prevention circuit 51 being provided in parallel with the on period signal generating module 3, the signal logical sum module 56 takes the logical sum of their outputs, and outputs it as the on period signal S23. A configuration of the whole of the relevant power generating circuit is one wherein, of the components shown in FIG. 3, the on period signal generating module 3 is replaced with the corrected on period signal generating module 6.

The secondary voltage raising circuit 52 is a voltage raising circuit which, based on the signal of the clock signal PCLK, raises the voltage of the main power source 11, and outputs a secondary output voltage 57. The clock stop detection module 53 is connected to the secondary voltage raising circuit 52. While the clock signal PCLK is driving normally, the clock stop detection module 53 outputs the H voltage as the clock stop detection signal 55 in response to the voltage sequentially supplied from the secondary voltage raising circuit 52.

As the clock stop detection signal 55 is constantly of the H voltage when the clock is driving normally, when the pre-correction on period signal 54 output by the on period signal generating module 3 is of the H voltage, the signal logical sum module 56 outputs the H voltage, while when the pre-correction on period signal 54 is of the L voltage, the signal logical sum module 56 outputs the L voltage. That is, when the clock is driving normally, the signal logical sum module 56 outputs the pre-correction on period signal 54 output by the on period signal generating module 3, as it is, as the on period signal 23.

Also, as the supply of voltage supplied from the secondary voltage raising circuit 52 stops in the event that the clock signal PCLK comes to an abnormal stop, the clock stop detection signal 55 drops to the L voltage, after a predetermined time has elapsed, by means of an electrical resistor 62 provided in the clock stop detection module 53.

Because of this, in the event that the pre-correction on period signal 54 is of the L voltage when the clock signal PCLK comes to an abnormal stop, the signal logical sum module 56 outputs the L voltage, and the signal logical sum module 56 also outputs the L voltage, after the predetermined time has elapsed, even in the event that the pre-correction on period signal 54 is of the H voltage. That is, in the event that the clock signal PCLK comes to an abnormal stop, whether the pre-correction on period signal 54 is of the H voltage or the L voltage, the signal logical sum module 56 outputs the L voltage as the on period signal 23, no later than when the predetermined time has elapsed. Because of this, the switching element 2 being turned off no later than when the predetermined time has elapsed after the clock signal PCLK coming to an abnormal stop, it is possible to prevent a large current flowing from the main power source 11 provided in the device to the switching element 2.

Hereafter, a description will be given of details of each configuration.

Figure 9:
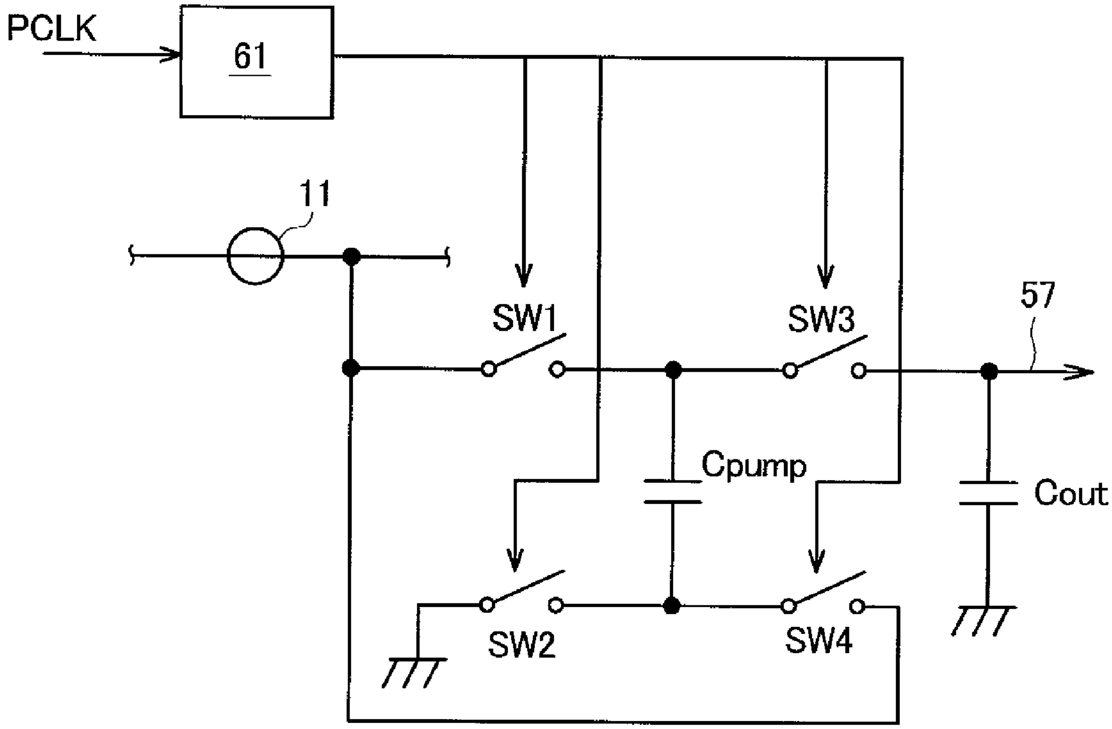
FIG. 9 is an outline diagram showing a configuration of a secondary voltage raising circuit indicating one example of the embodiment of the invention.

FIG. 9 is an outline diagram showing a configuration of the secondary voltage raising circuit 52. The secondary voltage raising circuit 52 is, for example, a heretofore known charge pump type voltage raising circuit. A charge pump type voltage raising circuit is a circuit which outputs a raised voltage by repeatedly carrying out a charging of a pump capacitor $C_{pump}$ provided in the circuit, and a discharge of the charge to an output capacitor $C_{out}$, by controlling four switching elements provided in the circuit.

Based on an input clock signal PCLK, a switch control module 61 alternately turns on switching elements SW1 and SW2, and switching elements SW3 and SW4, shown in FIG. 9. Herein, a switching element being a transistor such as a field effect transistor (FET), the switching element is turned on by the H voltage being applied to a gate voltage of the relevant transistor, while the switching element is turned off by the L voltage being applied to the gate voltage.

Figure 10A:
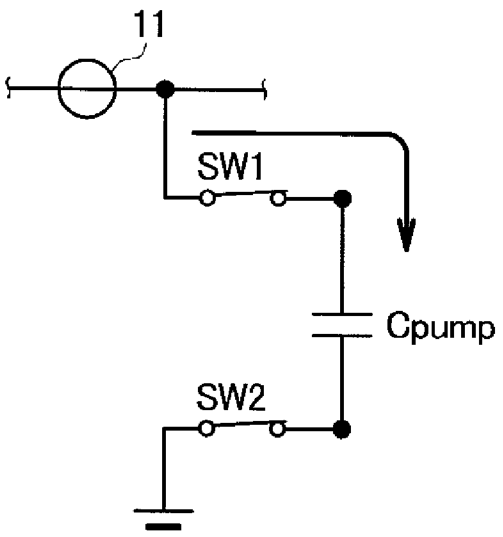
FIGS. 10A and 10B being outline diagrams of the secondary voltage raising circuit indicating one example of the embodiment of the invention.
Figure 10B:
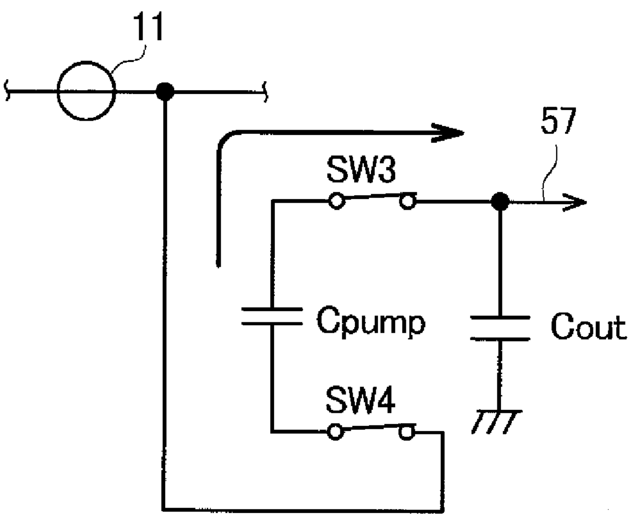

When the switching elements SW1 and SW2 are turned on, and the switching elements SW3 and SW4 are turned off, a current flows into the pump capacitor $C_{pump}$ from the main power source 11, and the pump capacitor $C_{pump}$ is charged. The flow of the current in this case is shown in FIG. 10A. FIGS. 10A and 10B are ones wherein portions which, due to the switching elements being turned off, do not contribute to the flow of the current are removed from the configuration shown in FIG. 9. As the switching elements SW3 and SW4 are turned off in FIG. 10A, the portion which, because of this, does not contribute to the flow of the current is not displayed. Also, the flow of the current is shown by an arrow in the drawing. As the negative electrode of the pump capacitor $C_{pump}$ is grounded after the charging of the pump capacitor $C_{pump}$ is completed, the potential of the positive electrode of the pump capacitor $C_{pump}$ is the same as the potential of the main power source 11.

Next, the switch control module 61 turns off the switching elements SW1 and SW2, and turns on the switching elements SW3 and SW4. At this time, the current flows from the pump capacitor $C_{pump}$ to the output capacitor $C_{out}$, and the potential of the positive electrode of the output capacitor $C_{out}$ becomes higher than the potential of the main power source 11.

In the same way, the flow of the current in this case is shown in FIG. 10B. As the switching elements SW1 and SW2 are turned off in FIG. 10B, in the same way, the portion which, because of this, does not contribute to the flow of the current is not displayed. Also, in the same way, the flow of the current is shown by an arrow in the drawing.

On turning on the SW4 after turning the switching elements SW1 and SW2 off from the charged pump capacitor $C_{pump}$, the negative electrode of the pump capacitor $C_{pump}$ is connected to the main power source 11. Because of this, the potential of the positive electrode of the pump capacitor $C_{pump}$ becomes higher than the potential of the main power source 11. Then, by turning on the SW3, the current flows to the output capacitor $C_{out}$ from the positive electrode of the pump capacitor $C_{pump}$, which has a high potential, the pump capacitor $C_{pump}$ is discharged, and the output capacitor $C_{out}$ is charged.

As long as this switching element condition is maintained, the output capacitor $C_{out}$ being discharged by means of the electrical resistor 62 provided in the clock stop detection module 53, to be described hereafter, the potential of the positive electrode of the output capacitor $C_{out}$ drops with time.

However, by the switch control module 61 repeatedly turning on the switching elements SW1 and SW2 and switching elements SW3 and SW4 alternately, the pump capacitor $C_{pump}$ alternates between being charged and discharged. Because of this, the potential of the positive electrode of the output capacitor $C_{out}$ is maintained at or above a certain potential, and the secondary output voltage 57 too, in the same way, is maintained at or above a certain potential.

Figure 11:
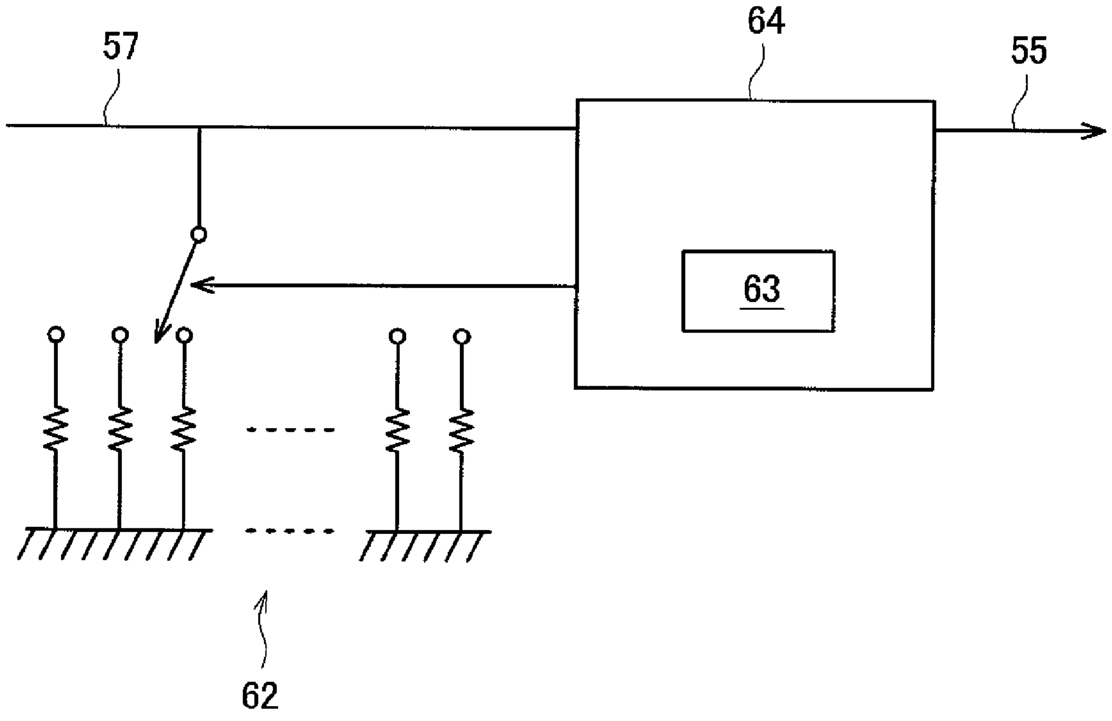
FIG. 11 is an outline diagram showing a configuration of a clock stop detection module indicating one example of the embodiment of the invention.

The clock stop detection module 53 is connected to the output of the secondary voltage raising circuit 52. FIG. 11 is an outline diagram showing a configuration of the clock stop detection module 53. As shown in FIG. 11, the clock stop detection module 53 is configured of a plurality of electrical resistors 62 including a switching element, and a stop detection control module 64 including a storage module 63. A stop determination time, based on a resistance value of the electrical resistor and an output capacitor $C_{out}$ capacity time constant, is set in the storage module 63 for each of the plurality of electrical resistors 62. The stop detection control module 64, under a predetermined condition such as a cycle of the clock signal PCLK, selects the electrical resistor 62 to be connected depending on the switching element, and connects it.

As previously described, as the output capacitor $C_{out}$ is discharged by means of the electrical resistor 62, the potential of the positive electrode of the output capacitor $C_{out}$ drops in the event that there is no supply of a new charge, meaning that the clock stop detection signal 55, which is the output signal of the clock stop detection module, drops in the same way.

However, as a charge is supplied sequentially to the output capacitor $C_{out}$ from the pump capacitor $C_{pump}$ in the event that the clock signal PCLK is driving normally, the potential of the positive electrode of the output capacitor $C_{out}$ is maintained at or above a certain voltage. In this case, the stop detection control module 64 determines that the clock signal PCLK is driving normally, and outputs the H voltage to the signal logical sum module 56 as the clock stop detection signal 55.

As opposed to this, in the event that the clock signal PCLK comes to an abnormal stop, the supply of the charge to the output capacitor $C_{out}$ stops, as previously described. In this case, as previously described, the potential of the positive electrode of the output capacitor $C_{out}$ drops with time, due to the electrical resistor 62.

The stop detection control module 64 compares the potential of the positive electrode of the output capacitor $C_{out}$ and a predetermined potential. Then, in the event that a condition wherein the potential of the positive electrode of the output capacitor $C_{out}$ is lower than the predetermined potential continues for the stop determination time corresponding to the electrical resistor 62 set in the storage module, or for longer, the stop detection control module 64 determines that the clock signal PCLK has come to an abnormal stop, and outputs the L voltage to the signal logical sum module 56 as the clock stop detection signal 55.

Figure 12:
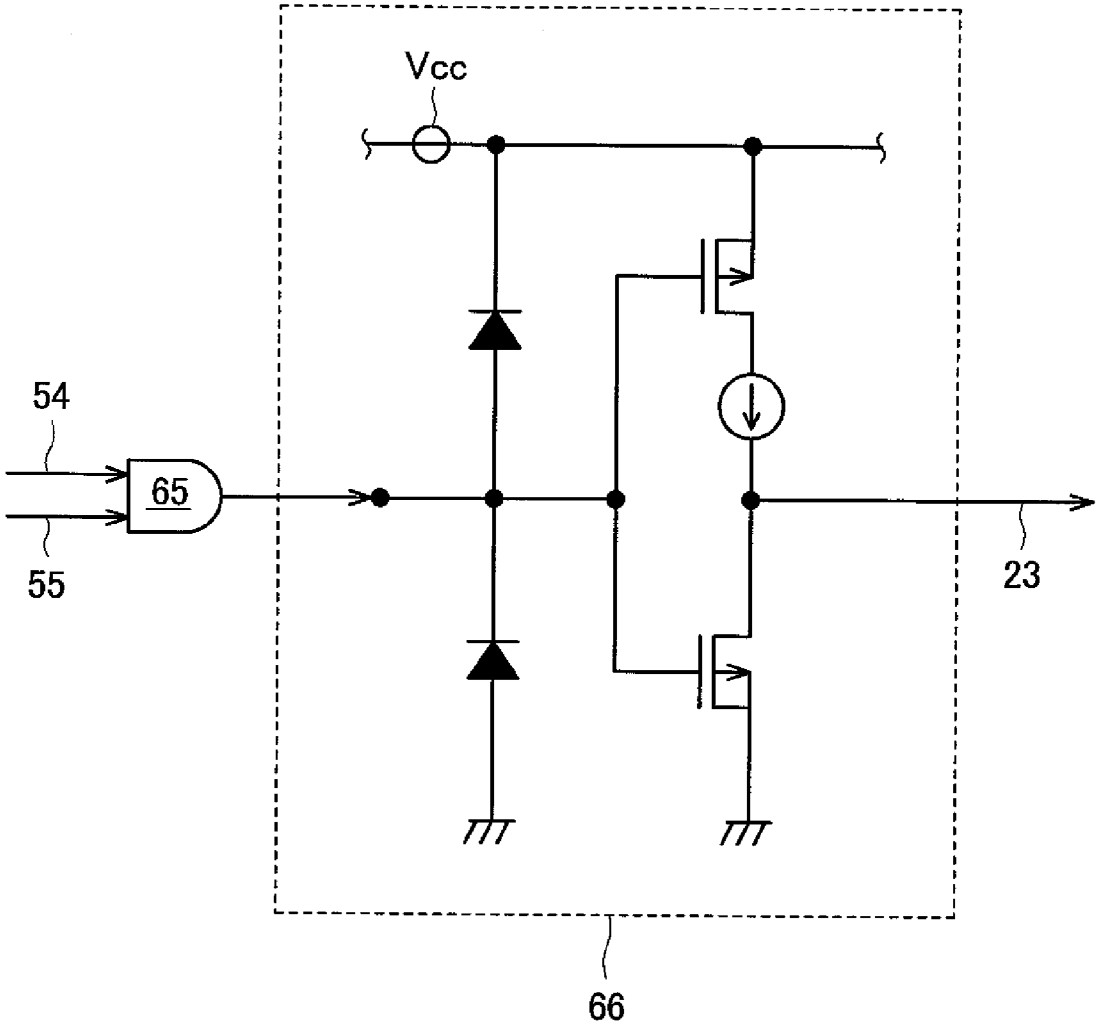
FIG. 12 is an outline diagram showing a configuration of a signal logical sum module indicating one example of the embodiment of the invention.

As previously described, the signal logical sum module 56 is connected to the output of the on period signal generating module 3 and the output of the abnormal termination time problem prevention circuit 51. FIG. 12 is an outline diagram showing a configuration of the signal logical sum module 56. As shown in FIG. 12, a logical sum gate 65 provided in the signal logical sum module 56 takes the logical sum of the pre-correction on period signal 54, which is the output of the on period signal generating module 3, and the clock stop detection signal 55, which is the output of the abnormal termination time problem prevention circuit 51. That is, the H voltage is output only when the pre-correction on period signal 54 and clock stop detection signal 55 are both of the H voltage, while the L voltage is output in cases other than this.

In the embodiment, a heretofore known power-off terminal 66 is connected to the output of the logical sum gate 65, outputting the H and L voltages more stably. That is, in the event that the output of the logical sum gate 65 is the H voltage, the on period signal 23 is of an H voltage having a value of a power-off terminal setting voltage $V_{cc}$. Also, in the event that the output of the logical sum gate 65 is the L voltage, the on period signal 23, being grounded, is of the L voltage, and an operation of an internal circuit including the switching element 2 stops.

According to the heretofore described configuration, when the clock signal PCLK is driving normally, the signal output by the on period signal generating module 3 is output to the switching element 2 as the on period signal S23, while when the clock signal PCLK comes to an abnormal stop, it is possible to prevent a large current flowing from the main power source 11 to the switching element 2 by lowering the on period signal S23 to the L voltage no later than when the predetermined time has elapsed. Because of this, even in the event that the clock signal PCLK comes to an abnormal stop, it is possible to lengthen the usable lifespan of the device, without inflicting large damage on the device.

Figure 15:
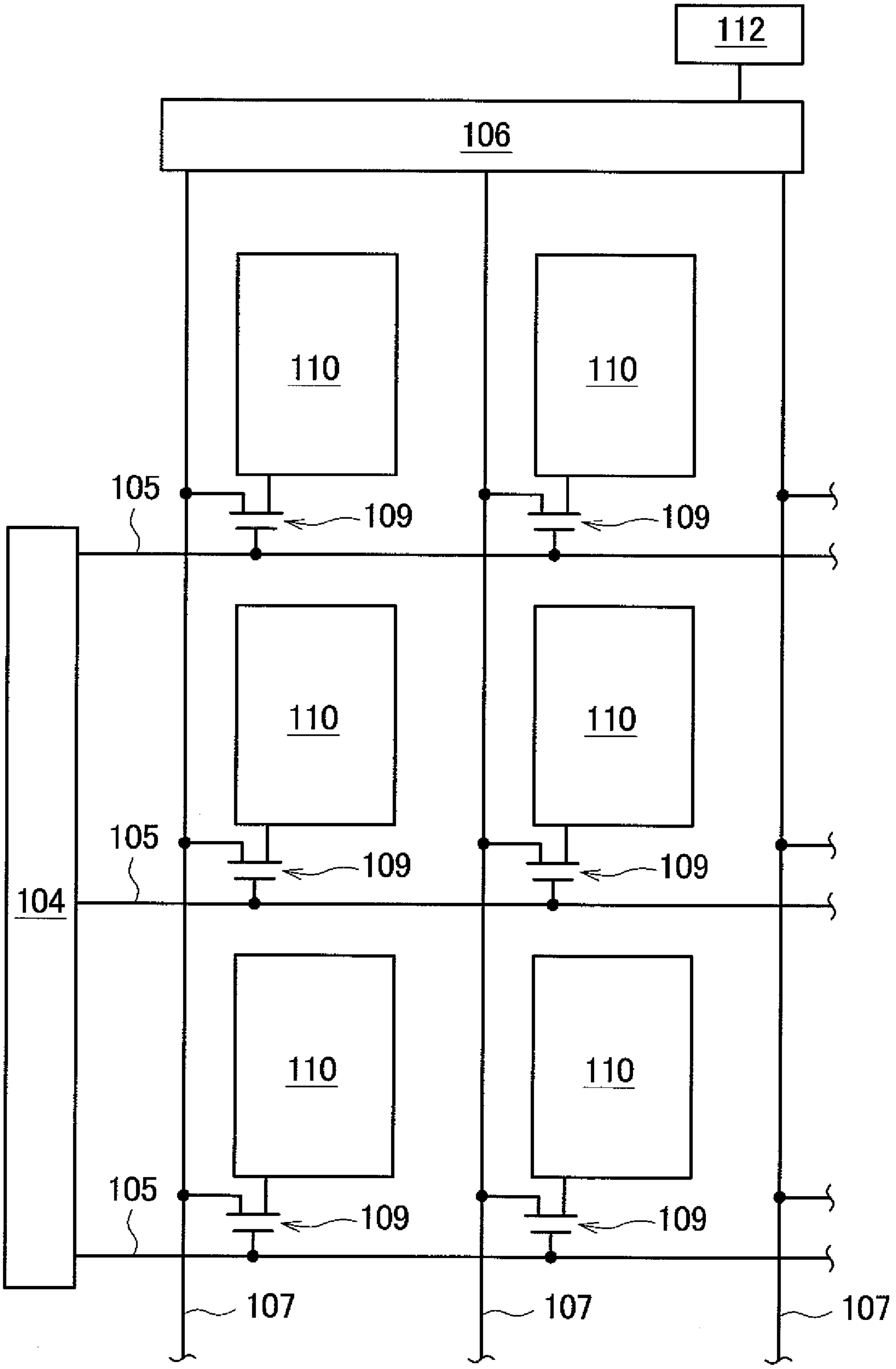
FIG. 15 is a diagram of an equivalent circuit of a TFT substrate which is one portion of a display device indicating another example of the embodiment of the invention.

Heretofore, for the display device according to the embodiment of the invention, a description has been given of an IPS type liquid crystal display device, as shown in FIG. 2, but it is acceptable that the display device according to the invention is another drive type of liquid crystal display device, such as a vertically aligned (VA) type, or twisted nematic (TN) type, and it is also acceptable that it is another display device, such as an organic EL display device. FIG. 15 is a diagram showing an equivalent circuit of the TFT substrate 102 provided in the VA type and TN type liquid crystal display devices. In the case of the VA type and TN type, the common electrodes 111 are provided in the filter substrate 101 opposing the TFT substrate 102.

What is claimed is:

1. A display device comprising:

a display panel; and a power generating circuit which supplies an output voltage to the display panel, the power generating circuit including:

a voltage raising circuit which generates the output voltage;

a switching element which drives the voltage raising circuit;

an on signal generating circuit which outputs a signal turning on the switching element to the switching element during an on period;

an output voltage detection circuit which detects a polarity of the output voltage of the voltage raising circuit with respect to setting voltage, and outputs a code; and an on period determination unit which determines a length of the on period of a following cycle based on the code, wherein the on period determination unit determines the on period of the following cycle in such a way that the length of the on period increases or decreases by a predetermined width in accordance with a timing at which the code is the same in two consecutive cycles, and determines the on period of the following cycle in such a way that the length of the on period increases or decreases differently from the predetermined width in accordance with a timing at which the code differs in two consecutive cycles.

2. A display device according to claim 1, wherein the on period determination unit including a storage module which stores on period information, the storage module stores one item of the on period information in accordance with a timing at which the code differs in two consecutive cycle periods.

3. A display device according to claim 1, wherein the on period determination unit, in accordance with a timing at which the code differs in two consecutive cycle periods, determines the length of the on period by taking an average value of the on period corresponding to the timing and the on period stored in the storage module.

* * * * *